(12) United States Patent
Brassel et al.

(10) Patent No.: US 10,988,164 B2
(45) Date of Patent: Apr. 27, 2021

(54) ELECTROMECHANICAL SERVO STEERING SYSTEM HAVING A SPRING-LOADED BEARING ARRANGEMENT

(71) Applicants: THYSSENKRUPP PRESTA AG, Eschen (LI); thyssenkrupp AG, Essen (DE)

(72) Inventors: Michael Brassel, Buchs (CH); Ulrich Schlegel, Maienfeld (CH); Mario Dällenbach, Root (CH); Michael Dona, Ludesch (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 176 days.

(21) Appl. No.: 16/340,169

(22) PCT Filed: Oct. 12, 2017

(86) PCT No.: PCT/EP2017/076006
§ 371 (c)(1),
(2) Date: Apr. 8, 2019

(87) PCT Pub. No.: WO2018/069423
PCT Pub. Date: Apr. 19, 2018

(65) Prior Publication Data
US 2019/0308658 A1    Oct. 10, 2019

(30) Foreign Application Priority Data
Oct. 14, 2016    (DE) ............... 10 2016 012 246.3

(51) Int. Cl.
*F16H 55/24*    (2006.01)
*B62D 5/04*    (2006.01)
(Continued)

(52) U.S. Cl.
CPC ........... *B62D 5/0409* (2013.01); *F16C 19/16* (2013.01); *F16C 23/084* (2013.01);
(Continued)

(58) Field of Classification Search
CPC .. F16C 25/083; F16C 35/077; F16C 2326/24; F16C 23/082; F16C 23/084; F16C 35/07;
(Continued)

(56) References Cited

U.S. PATENT DOCUMENTS 4,144,957 A * 3/1979 de Gennes .............. F16D 23/14
192/98
4,334,718 A * 6/1982 Hirt .......................... F16C 27/04
310/90.5
(Continued)

FOREIGN PATENT DOCUMENTS

CN    105008208 A    10/2015
DE    101 61 715 A    6/2003
(Continued)

OTHER PUBLICATIONS

English Translation of International Search Report issued in PCT/EP2017/076006, dated Jan. 2, 2018.

*Primary Examiner* — Jake Cook
*Assistant Examiner* — T. Scott Fix
(74) *Attorney, Agent, or Firm* — thyssenkrupp North America, LLC

(57) ABSTRACT

An electromechanical servo steering system with an electric servomotor having a motor shaft that drives a shaft which cogs with a helical gear. The shaft is arranged in a transmission housing and is mounted rotatably about an axis of rotation at its end near the motor in a bearing arrangement and is mounted pivotably in the transmission housing about a pivot axis which lies transverse to the axis of rotation. At least one spring element is provided which axial pretensions
(Continued)

a bearing element that is pivotably movable with the shaft about the pivot axis, of the bearing arrangement in a spring-elastic manner against a bearing element that is arranged in a stationary manner in the transmission housing, of the bearing arrangement, wherein precisely two spring elements are provided which are arranged oppositely in the circumferential direction of the bearing arrangement.

13 Claims, 3 Drawing Sheets

(51) Int. Cl.
| | |
|---|---|
| *F16C 19/16* | (2006.01) |
| *F16H 1/16* | (2006.01) |
| *F16H 57/022* | (2012.01) |
| *F16H 57/039* | (2012.01) |
| *F16H 57/12* | (2006.01) |
| *F16C 25/08* | (2006.01) |
| *F16C 23/08* | (2006.01) |
| *F16C 35/077* | (2006.01) |
| *F16H 57/021* | (2012.01) |

(52) U.S. Cl.
CPC ......... *F16C 25/083* (2013.01); *F16C 35/077* (2013.01); *F16H 1/16* (2013.01); *F16H 55/24* (2013.01); *F16H 57/022* (2013.01); *F16H 57/039* (2013.01); *F16H 57/12* (2013.01); *F16C 2326/24* (2013.01); *F16C 2361/61* (2013.01); *F16C 2380/26* (2013.01); *F16H 2057/0213* (2013.01); *F16H 2057/0222* (2013.01); *F16H 2057/127* (2013.01)

(58) Field of Classification Search
CPC ...... F16C 27/04; F16C 2229/00; F16C 27/00; F16C 27/527; F16C 27/083; F16C 27/06; F16C 27/066; F16C 23/043; F16C 23/045; F16C 23/046; F16H 1/16; F16H 55/24; F16H 57/022; F16H 57/039; F16H 57/12; F16H 2057/0222; F16H 2057/0225; F16H 2057/0127; F16H 2057/0213; F16H 19/04; B62D 3/123
See application file for complete search history.

(56) References Cited

U.S. PATENT DOCUMENTS

| | | | |
|---|---|---|---|
| 5,917,258 A * | 6/1999 | Kershaw | H02K 5/1672 310/43 |
| 6,452,299 B2 * | 9/2002 | Drexlmaier | H02K 5/1672 310/90 |
| 6,948,857 B2 * | 9/2005 | Schuetz | F16C 23/084 384/498 |
| 7,217,039 B2 * | 5/2007 | Baudelocque | F16C 27/04 384/624 |
| 8,106,556 B2 * | 1/2012 | Brunet | F16C 39/02 310/90.5 |
| 9,024,494 B2 * | 5/2015 | Hawkins | F16C 39/02 310/90.5 |
| 9,278,752 B2 * | 3/2016 | Osvog | F16C 27/02 |
| 9,702,403 B2 * | 7/2017 | Beck | F16C 27/04 |
| 9,752,620 B2 * | 9/2017 | Little | F16C 33/7823 |
| 10,087,987 B2 * | 10/2018 | Falomi | F16C 19/542 |
| 10,302,134 B2 * | 5/2019 | Oomori | F16C 23/045 |
| 10,590,961 B2 * | 3/2020 | Sumimoto | F04D 29/059 |
| 2004/0222036 A1 | 11/2004 | Berhard | |
| 2006/0078241 A1 * | 4/2006 | Moehring | F16C 27/08 384/223 |
| 2010/0054645 A1 * | 3/2010 | Milliken | F16C 35/045 384/477 |
| 2012/0051906 A1 * | 3/2012 | House | F16C 35/077 415/229 |
| 2012/0125132 A1 * | 5/2012 | Bernhard | F16C 27/04 74/89.14 |
| 2015/0053034 A1 | 2/2015 | Fuechsel | |
| 2016/0031473 A1 | 2/2016 | Riepold | |
| 2016/0068184 A1 | 3/2016 | Kimoto | |
| 2017/0291634 A1 * | 10/2017 | Kim | B62D 5/0448 |
| 2018/0003292 A1 * | 1/2018 | Figura | F16C 35/077 |

FOREIGN PATENT DOCUMENTS

| | | | | |
|---|---|---|---|---|
| DE | 103 07 880 A | | 9/2004 | |
| DE | 102004034701 A1 * | | 2/2006 | ........... F16C 27/066 |
| DE | 10 2006 039 740 A | | 2/2008 | |
| DE | 10 2008 001 878 A | | 11/2009 | |
| DE | 10 2008 042 608 A | | 4/2010 | |
| DE | 10 2009 016 187 A | | 10/2010 | |
| DE | 10 2009 054 655 A | | 6/2011 | |
| DE | 10 2012 103 147 A | | 10/2013 | |
| DE | 102012222802 A1 * | | 6/2014 | ........... F16C 27/066 |
| DE | 10 2015 208 334 A | | 3/2016 | |
| DE | 20 2016 103 802 U | | 7/2016 | |
| JP | 2009287658 A * | | 12/2009 | ........... F16C 33/586 |
| JP | 2010221891 A * | | 10/2010 | ........... F16H 57/022 |
| WO | WO-2008087749 A1 * | | 7/2008 | ........... H02K 7/081 |

* cited by examiner

ELECTROMECHANICAL SERVO STEERING SYSTEM HAVING A SPRING-LOADED BEARING ARRANGEMENT

CROSS REFERENCE TO RELATED APPLICATIONS

This application is a U.S. National Stage Entry of International Patent Application Serial Number PCT/EP2017/076006, filed Oct. 12, 2017, which claims priority to German Patent Application No. DE 10 2016 012 246.3, filed Oct. 14, 2016, the entire contents of both of which are incorporated herein by reference.

FIELD

The present disclosure generally relates to an electromechanical servo steering system.

BACKGROUND

In electromechanical servo steering systems, a torque is generated via an electric motor, which torque is transmitted to a transmission and is overlaid there by the steering moment provided by the driver.

A generic electromechanical servo steering system comprises an electric servomotor which drives a worm shaft which cogs with a worm gear arranged on a steering shaft, wherein the worm gear is operatively connected to an input shaft of a steering gear and wherein the worm shaft and the steering shaft are rotatably mounted in a joint transmission housing. The worm shaft is connected to the motor shaft of the electric servomotor via a coupling.

DE 10 2008 001 878 A1 discloses a pivot bearing for a worm gearing, wherein the worm is mounted by means of a cardanically mounted bearing ring. The bearing ring comprises in this case a pivot axis which runs perpendicular to the axis of rotation and in the direction of the worm gear. This configuration has been shown to be disadvantageous since the coupling is under greater load, as a result of which the coupling wears more quickly with time and increased tooth flank play with corresponding vibration noises occurs.

It is furthermore known to configure the bearing with a lot of play so that the desired pivotability is possible. This method is, however, problematic in that different thermal expansions arise as a result of large component tolerances.

A pivot bearing which comprises spring elements which support the bearing towards the housing is known from first publication DE 10 2009 016 187 A1. It is provided in this case that the spring force is not distributed evenly on the circumference so that a pivoting moment in the form of a tilting moment is generated on the bearing element. This tilting moment is directed so that the bearing ring and thus the shaft are pretensioned in a targeted manner in a pivoting direction and can be inclined with a central axis in relation to the rotational axis. The worm shaft can thus be pretensioned in the steering gearing in a targeted manner in the direction of a play-free tooth engagement against the toothing of the worm gear. The spring element thus rotates in the direction of the pivoting movement, as a result of which the coupling is under greater load. This has the result that the coupling wears to a greater extent and increased tooth flank play with corresponding vibration noises occurs.

Thus a need exists for an electromechanical servo steering system with a worm gearing in the case of which the coupling between motor shaft and worm shaft is under less load and noise and play can thus be reduced.

DETAILED DESCRIPTION

Figure 1:
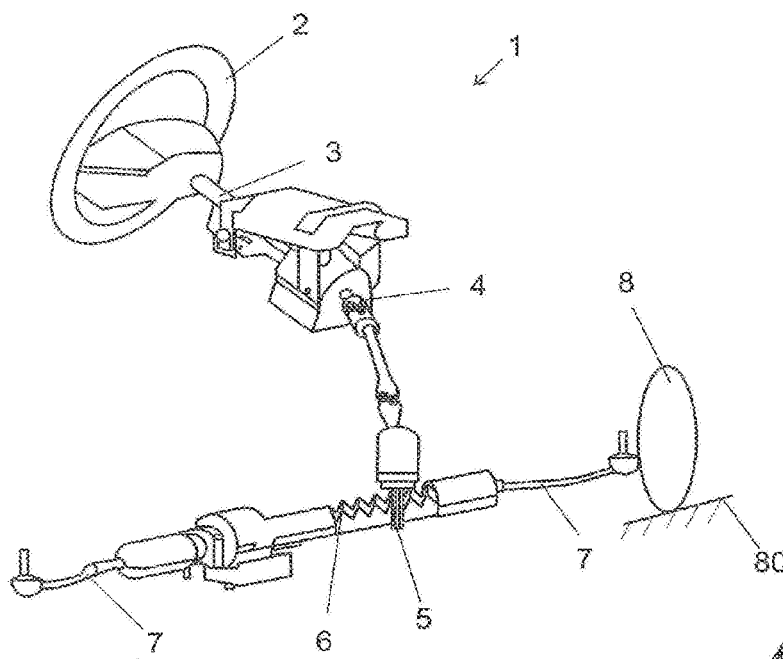
FIG. 1 is a schematic view of an electromechanical servo steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an electromechanical servo steering system.

There is accordingly provided an electromechanical servo steering system with an electric servomotor with a motor shaft which drives a shaft which cogs with a helical gear, wherein the shaft is arranged in a transmission housing and is mounted rotatably about an axis of rotation at its end near the motor in a bearing arrangement and is mounted pivotably in the transmission housing about a pivot axis which lies transverse to the axis of rotation, wherein at least one spring element is provided which axially pretensions a bearing element, which is pivotably movable with the shaft about the pivot axis, of the bearing arrangement in a spring-elastic manner against a bearing element, which is arranged in a stationary manner in the transmission housing, of the bearing arrangement and that two spring elements are provided which are arranged oppositely in the circumferential direction of the bearing arrangement. The spring elements can as a result be produced to be particularly small and at low cost and enable axial pretensioning and centering of the bearing arrangement on both sides.

The pivot axis preferably runs at a defined angle between an axis of the pivot lever about an axis of rotation of the helical gear or about an axis of rotation of a steering shaft. The defined angle is, in an installation state of the bearing, preferably provided in the range between 20° and 30°, particularly preferably the defined is in contrast around 27°.

The at least one spring element is preferably configured in such a manner that, in an installed and unloaded state of the bearing arrangement, the forces generated by the pretensioning in the axial direction of the axis of rotation on the bearing element which pivotably movable about the pivot axis are canceled out. The at least one spring element thus only generates a small pivoting moment in comparison with an adjustable pretensioning, for example, via a pretensioning apparatus, rather the bearing arrangement is held in the neutral position. As a result of this, an increased rigidity is generated in the zero crossing of the axial movement of the bearing so that noises can be reduced. The spring-elastic connection between the bearing elements allows a pivoting movement which puts a lower strain on the coupling between the motor shaft and worm shaft and thus reduces noise.

An unloaded state of the bearing arrangement refers to the situation where no external forces act on the bearing arrangement and the worm shaft is in its normal position and no forces proceed from the worm shaft onto the bearing arrangement. The central axis of the worm shaft is thus congruent with the rotational axis of the motor shaft. The bearing arrangement is in an unpivoted state in this case.

The pivot axis is preferably arranged in the region of the bearing arrangement and penetrates through this.

The at least one spring element is particularly preferably penetrated centrally by the pivot axis. The spring element thus only generates small forces. Due to the fact that the pivot axis penetrates centrally through the spring element, uneven pivoting can be prevented.

The bearing element which is pivotably movable about the pivot axis is preferably a bearing ring which is surrounded on the circumferential side at least partially by the bearing element arranged in a stationary manner in the transmission housing, wherein the bearing ring is supported radially in the bearing element and is pivotable relative to the bearing element, and that the at least one spring element is fastened to the bearing element, wherein the bearing ring is pretensioned by means of the at least one spring element in a spring-elastic manner centered against the bearing element.

The bearing element arranged in a stationary manner in the transmission housing is furthermore preferably a pivot ring.

The bearing arrangement preferably comprises an anti-friction bearing, the outer ring of which forms the bearing ring which is arranged pivotably in the pivot ring fixed on the transmission housing.

It is preferred that the at least one spring element is configured in such a manner that the spring force acting on the bearing ring is identical for both pivoting directions, thus a uniform pivoting movement in both pivoting directions is possible.

It is advantageous if the at least one spring element engages around the bearing element arranged in a stationary manner and the bearing element which is pivotably movable about the pivot axis on the respective outside. The at least one spring element can thus be formed as a type of clamp.

The at least one spring element can comprise contours which interact with corresponding contours of the bearing element arranged in a stationary manner and/or of the bearing element which is pivotably movable about the pivot axis and form a spring-elastic connection between the bearing element arranged in a stationary manner and the bearing element which is pivotably movable about the pivot axis. It is furthermore conceivable and possible that the least one spring element is arranged in a non-positive and/or frictionally engaged manner on the pivot ring so that the spring element is supported against a transmission housing even if the spring element moves away from the axis of rotation of the worm over the service life.

It is preferred that the at least one spring element is formed to be substantially U-shaped in cross-section, as a result the spring element can be configured to be particularly simple and small.

In one preferred embodiment, the helical gear is a worm gear and the shaft is a worm shaft.

The helical gear is preferably operatively connected to an input shaft of a steering gear of a motor vehicle and the worm gear is arranged on a steering shaft of a motor vehicle.

It is furthermore preferred that the at least one spring element is produced from spring steel or plastic.

An electromechanical motor vehicle steering system 1 with a steering wheel 2, which is coupled in a rotationally conjoint manner to an upper steering shaft 3 and a lower steering shaft 4, is represented schematically in FIG. 1. Upper steering shaft 3 is functionally connected via a torsion rod to lower steering shaft 4. Lower steering shaft 4 is connected in a rotationally conjoint manner to a pinion 5. Pinion 5 cogs in a familiar manner with a tooth segment of a toothed rack 6. Toothed rack 6 is mounted in a steering housing displaceably in the direction of its longitudinal axis. At its free end, toothed rack 6 is connected to tie rods 7 via ball joints, not represented. Tie rods 7 themselves are connected in a familiar manner via axle journals to in each case one steered wheel 8 of the motor vehicle. A rotation of steering wheel 2 leads via the connection of steering shaft 3, 4 and of pinion 5 to a longitudinal displacement of toothed rack 6 and thus to a pivoting of steered wheels 8. Steered wheels 8 experience feedback via a carriageway 80, which feedback acts counter to the steering movement. A force which makes a corresponding torque at steering wheel 2 necessary is consequently necessary to pivot wheels 8. An electric motor of a servo unit is provided in order to support the driver during this steering movement. The servo unit can be arranged here as a superimposed steering system on the steering column or as an auxiliary force assistance apparatus on pinion 5 or toothed rack 6.

Figure 2:
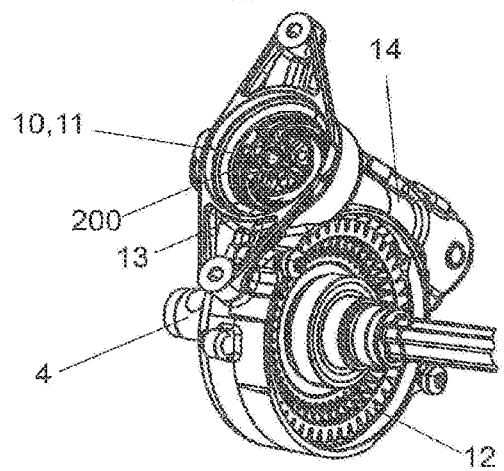
FIG. 2 is a perspective view of the transmission of the servo steering system from FIG. 1.

Transmission 9 of the servo unit is represented in FIG. 2. A servomotor, not represented, drives a worm shaft 10 which with its worm 11 is in engagement with a worm gear 12 which is connected in a rotationally conjoint manner to lower steering shaft 4 or pinion 5. In the case of an operation of the electric motor, worm shaft 10 is driven and worm 11 and worm gear 12 correspondingly rotate in order to provide a rotational support for lower steering shaft 4 or introduce a support moment directly into pinion 5.

Figure 3:
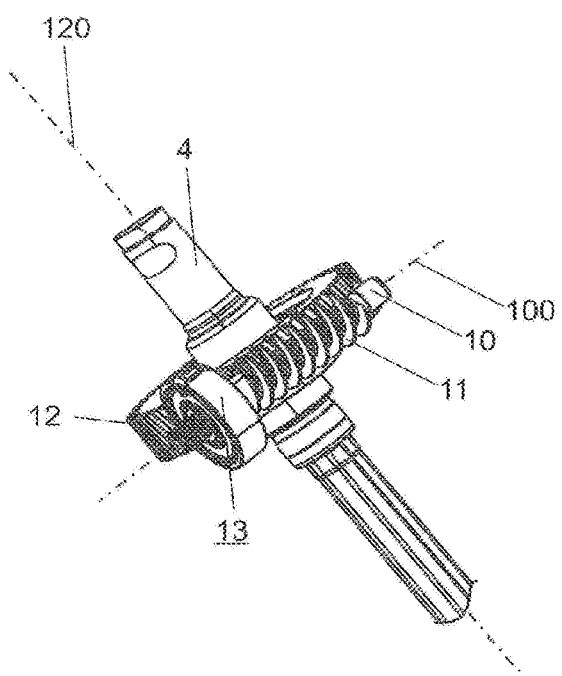
FIG. 3 is a perspective view of the transmission of FIG. 2 reduced to a worm shaft, a bearing and a worm gear.

FIG. 3 shows worm shaft 10 with a bearing arrangement 13 close to the motor and worm gear 12, which cogs with worm shaft 10, in a perspective representation, wherein the components of the transmission housing were omitted.

Figure 4:
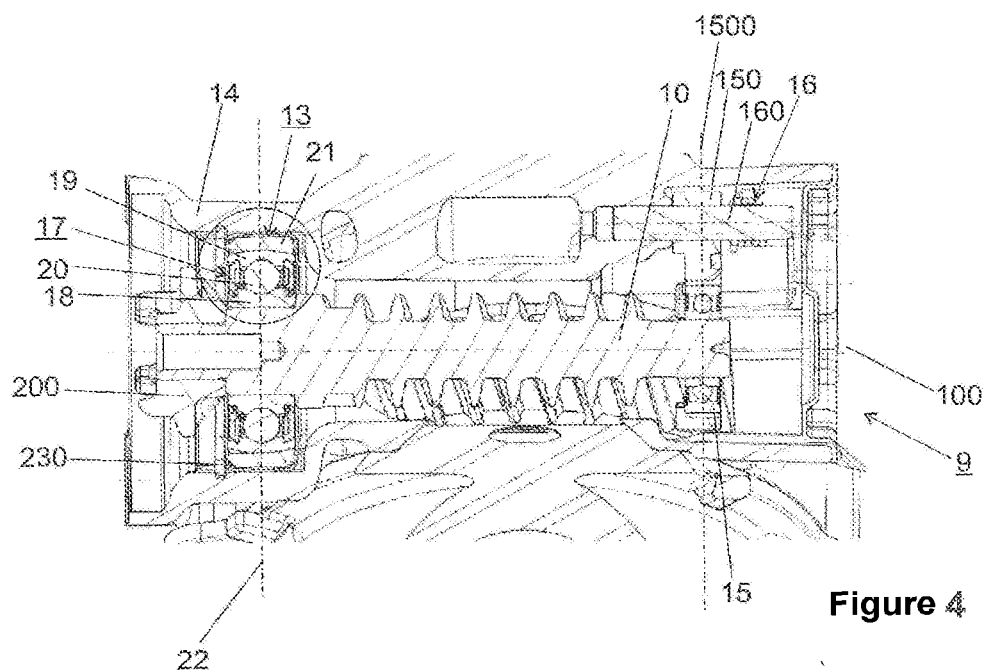
FIG. 4 is a longitudinal sectional view of the transmission from FIG. 2 along the worm shaft.

A part of transmission 9 is represented in a longitudinal section in FIG. 4. The longitudinal section runs in this case along an axis of rotation 100 of worm shaft 10 which is driven by the electric motor, not represented, and a pivot axis 22. The electric motor has a motor shaft which is coupled in a rotationally conjoint manner to worm shaft 10 via a coupling which is composed of two coupling parts. To this end, worm shaft 10 comprises a cylindrical bearing bushing into which a coupling part 200 is inserted. Worm shaft 10 cogs via the worm toothing with the worm gear. Worm gear 12 in turn is connected in a rotationally conjoint manner to, for example, a steering shaft which runs between a steering wheel, not represented, and the actual steering gear of the motor vehicle. The stated structural elements are mounted in a joint transmission housing 14.

Worm shaft 10 is mounted in transmission housing 14 by means of bearing arrangement 13 close to the motor and a bearing 15 remote from the motor. Bearing arrangement 13 close to the motor comprises a fixed bearing and a pivot bearing. A seal element 230, which is formed on one side of bearing arrangement 13 adjacent to coupling part 200 or on both sides of bearing arrangement 13, can be provided between transmission housing 14 and bearing arrangement 13 close to the motor. Bearing 15 remote from the motor is an anti-friction bearing which is formed as a ball bearing and allows small axial movements and changes in the axis of rotation of worm shaft 10 with respect to transmission housing 14. The position of worm shaft 10 is adjustable in relation to worm gear 12 by means of a pretensioning apparatus 16. Adjustment is preferably carried out on that side of worm shaft 10 which is remote from the motor.

Bearing arrangement 13 close to the motor comprises an anti-friction bearing 17 with an inner ring 18, rolling bodies 20 and an outer ring 19. Rolling bodies 20 run in grooves between inner ring 18 and outer ring 19. Inner ring 18 comprises an inner-cylindrical lateral surface for a tight fit on worm shaft 10. Outer ring 19 is received in a pivot ring 21 relative to the rotational axis. Pivot ring 21 is received in transmission housing 14 so that inner ring 18 is rotatable about rotational axis 100 together with worm shaft 10 with respect to rotationally fixed outer ring 19. Outer ring 19 comprises on the outer circumference a spherical surface which is convexly curved and which forms a contact surface to a contact surface on pivot ring 21. The contact surface of pivot ring 21 is concavely curved so that outer ring 19 can be pivoted about a pivot axis 22 as a pivotable bearing element in pivot ring 21. Pivot axis 22 runs, in the unloaded state, centrally through bearing arrangement 13 so that two spring elements 23 are penetrated centrally by pivot axis 22. As a result of this, spring elements 23 thus generate only small forces, in a range of smaller than 5% in comparison with an adjustable pretensioning, for example, via a pretensioning apparatus 16 on a side of worm shaft 10 distant from the motor.

Since worm shaft 10 is pivotable about pivot axis 22 in bearing arrangement 13 close to the motor, it is provided that bearing 15 distant from the motor can be deflected.

Anti-friction bearing 15 distant from the motor, which is formed as a loose bearing, is arranged in a pivot lever 150, preferably composed of plastic, and is connected to pretensioning apparatus 16. Pretensioning apparatus 16 comprises a needle roller 160 which forms the pivot point of pivot lever 150. Axial displacements of worm 11, which occur as a result of the bearing play of the pivot bearing, are compensated for by movements of pivot lever 150 along needle roller 160.

Figure 5:
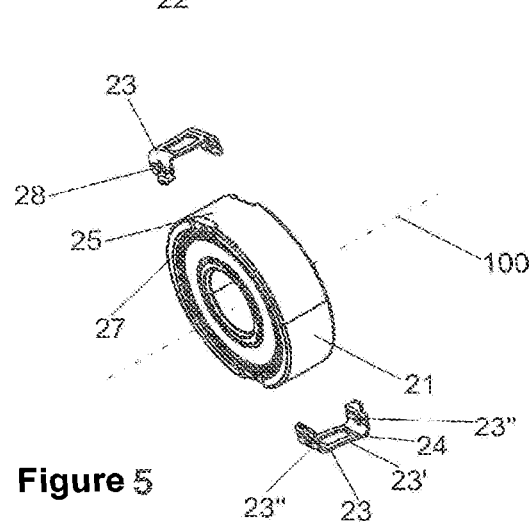
FIG. 5 is an exploded view of the bearing of the worm shaft.
Figure 6:
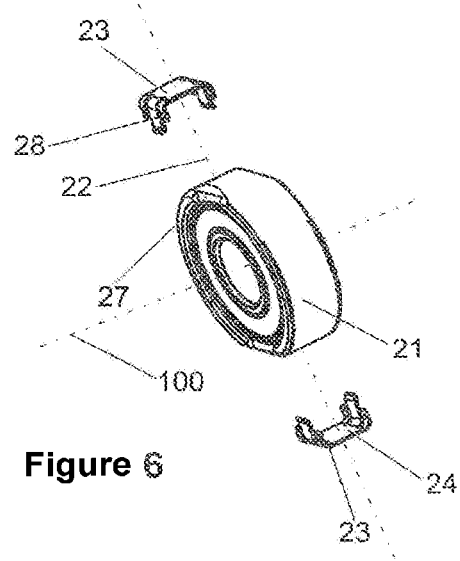
FIG. 6 is an alternative exploded view of the bearing of the worm shaft.
Figure 7:
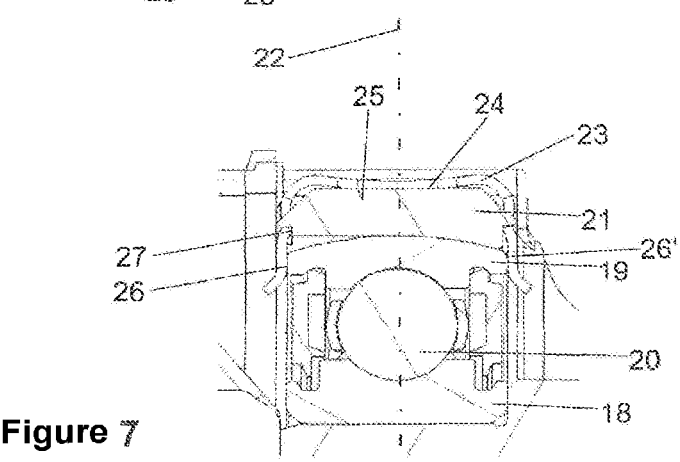
FIG. 7 is a longitudinal sectional view through the bearing.

FIGS. 5, 6 and 7 show the details of bearing arrangement 13.

Two elastic spring elements 23 connect pivot ring 21 to outer ring 19. Both elastic spring elements 23 comprise a substantially U-shaped cross-section and possess a rear wall 23' from which two side walls 23" protrude approximately at a right angle. Both spring elements 23 are formed identically. Spring elements 23 are configured to be mirror-symmetrical with respect to pivot axis 22 of bearing arrangement 13. Spring elements 23 lie with inner side 24 of rear wall 23' resting against outside 25 of pivot ring 21 and engage around pivot ring 21 and outer ring 19 on the respective outside. Spring elements 23 thus extend, in the installed state, from a first face side 26 of outer ring 19 to a second face side 26' of outer ring 19. Pivot ring 21 has contours 27 into which spring elements 23 can engage with their side walls 23" so that a fixing of the position of pivot ring 21 with respect to outer ring 19 is possible. Outer ring 19 can furthermore comprise contours in order to enable better fixing between pivot ring 21, outer ring 19 and spring element 23. As represented in FIG. 5 and FIG. 6, pivot ring 21 comprises, for this purpose, lateral opposite recesses 27 on the face sides into which spring element 23 engages. Spring elements 23 are thus connected in a stationary manner to pivot ring 21. Spring elements 23 can have recesses into which the contours of pivot ring 21 or of outer ring 19 can engage. Spring elements 23 furthermore comprise on their side walls contours 28 which interact with corresponding contours of the outer ring. These contours are also preferably provided on the face sides of outer ring 19. The contours can encompass complementary projections, recesses, latching elements, undercuts and the like in order to enable a non-positive and frictionally engaged connection. In the case of a plastic deformation, side walls 23" of spring elements 23 can approach one another in such a manner that outer ring 19 and pivot ring 21 assume a desired centering and provide an axial pretensioning.

The position of worm shaft 10 is adjustable in relation to worm gear 12 by means of a pretensioning apparatus 16. Adjustment is preferably carried out in this case on that side of worm shaft 10 which is distant from the motor.

Figure 8:
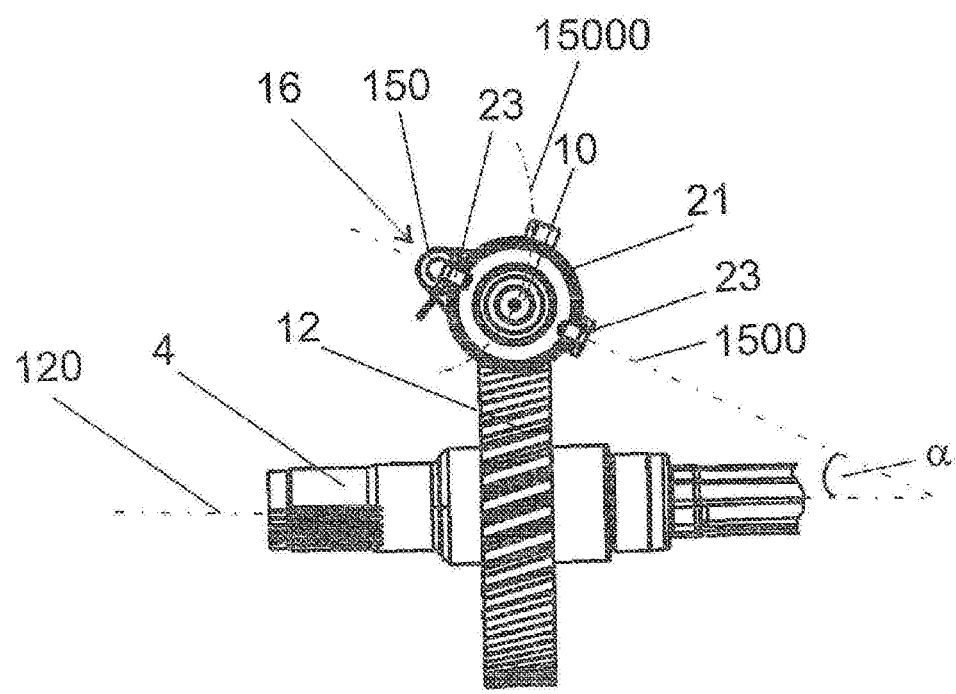
FIG. 8 is a side view of the transmission of FIG. 2 reduced to a worm shaft, a bearing, and a worm gear.

Both spring elements 23 are arranged oppositely in the circumferential direction of bearing arrangement 13. They lie on pivot axis 22 of the bearing arrangement which lies perpendicular to axis of rotation 100 of worm shaft 10. Spring elements 23 thus generate only small pivoting moments. Since spring elements 23 engage on both face sides of bearing arrangement 13 and are configured to be symmetrical to the bearing arrangement, the axial forces in the direction of axis of rotation 100 of the worm shaft are canceled out in the unloaded state of the bearing arrangement. It is apparent in FIG. 8 that pivot axis 22, which is defined by spring elements 23, of worm shaft 10 is arranged at a defined angle α to axis of rotation 120 of worm wheel 12 or steering shaft 3, 4. Pivot axis 22 is formed by the defined angle which is formed between axis of rotation 120 of worm wheel 12 and by an axis 1500 of pivot lever 150. This angle depends on the positioning or orientation of pivot lever 150. The defined angle preferably lies in a range between 20° and 30°. The defined angle particularly preferably assumes a value greater than 25°. A defined pivot path 15000 of bearing arrangement 13 is furthermore represented in FIG. 8.

Spring elements 23 axially pretension outer ring 19 arranged in pivot ring 21, as a result of which the movement of elements 21, 19 relative to one another is damped. A stopping of rings 21, 19 against one another is thus reduced, which improves the acoustics of bearing arrangement 13. Moreover, as a result of spring elements 23, the zero crossing of the axial movement is made more rigid, as a result of which annoying rattling noises can also be avoided.

An axial spring can be omitted in the coupling between motor and worm which enables easier pivoting movement and thus improved cushioning.

The spring elements can also assume other forms and be configured, for example, in two parts or comprise several retaining tongues which can assume identical or different forms, as represented in FIG. 6. The retaining tongues can protrude to the outside or inside. The retaining tongues can furthermore engage around pivot ring 21 or latch into pivot ring 21 by means of corresponding contours of pivoting ring 21. It can also be provided that the two spring elements extend over the entire circumference of the bearing arrangement and in each case cover only one face side. In this case, spring tongues would be provided which are arranged oppositely in the circumferential direction and lying on the pivot axis. The separation of the two spring elements would then be carried out in a plane with the pivot axis.

As a result of the spring elements, the load on the coupling can be reduced and pivoting can be simplified, which has a positive effect on the life span of the coupling and acoustics.

What is claimed is:

1. An electromechanical servo steering system, comprising:
    an electric servomotor;
    a shaft configured to be driven by the servomotor and engaged with a helical gear;
    wherein the helical gear defines a worm gear axis;
    wherein the shaft is arranged in a transmission housing, the shaft mounted rotatably about an axis of rotation at an end adjacent the servomotor in a bearing arrangement and mounted pivotably in the transmission housing about a pivot axis which lies transverse to the axis of rotation and at an angle of about 20 degrees to about 30 degrees relative to the worm gear axis; and
    only two spring elements configured to axially pretension a first bearing element of the bearing arrangement, the first bearing element pivotably movable with the worm shaft about the pivot axis of the bearing arrangement in a spring-elastic manner against a second bearing element of the bearing arrangement, the second bearing element arranged in a stationary manner in the transmission housing, wherein the spring elements are arranged oppositely in the circumferential direction of the bearing arrangement, wherein the pivot axis centrally extends through the two spring elements.

2. The electromechanical servo steering system of claim 1, wherein the pivot axis of the shaft is arranged at a defined angle of about 27 degrees with respect to the worm gear axis.

3. The electromechanical servo steering system of claim 1, wherein the spring elements are configured in such a manner that, in an installed and unloaded state of the bearing arrangement, the forces generated by the pre-tensioning in the axial direction of the axis of rotation on the first bearing element are canceled out.

4. The electromechanical servo steering system of claim 1, wherein the first bearing element is a bearing ring which is surrounded on a circumferential side at least partially by the second bearing element, wherein the bearing ring is supported radially in the second bearing element and is pivotable relative to the second bearing element, and that the spring elements are fastened to the second bearing element, wherein the bearing ring is pretensioned by means of the spring elements in a spring-elastic manner against the second bearing element.

5. The electromechanical servo steering system of claim 1, wherein the second bearing element is a pivot ring.

6. The electromechanical servo steering system of claim 5, wherein the bearing arrangement comprises an anti-friction bearing, the outer ring of which forms the first bearing ring which is arranged pivotably in the pivot ring fixed on the transmission housing.

7. The electromechanical servo steering system of claim 5, wherein the spring elements are configured in such a manner that the spring force acting on the bearing ring is equal for both pivot directions.

8. The electromechanical servo steering system of claim 1, wherein the spring elements engage around the second bearing element and the first bearing element on the respective outside.

9. The electromechanical servo steering system of claim 1, wherein the spring elements have contours that interact with corresponding contours of the second bearing element and/or of the first bearing element and form a spring-elastic connection between the second bearing element and the first bearing element.

10. The electromechanical servo steering system of claim 1, wherein the spring elements are substantially U-shaped in cross-section.

11. The electromechanical servo steering system of claim 1, wherein the helical gear is a worm gear and the shaft is a worm shaft.

12. The electromechanical servo steering system of claim 11, wherein the worm gear is operatively connected to an input shaft of a steering gear of a motor vehicle and the worm gear is arranged on a steering shaft of a motor vehicle.

13. The electromechanical servo steering system of claim 1, wherein the spring elements are produced from spring steel or plastic.

* * * * *